United States Patent [19]

Walton et al.

[11] 3,929,689

[45] Dec. 30, 1975

[54] FOAMED FLAME RETARDANT POLYOLEFIN COMPOSITIONS OF IMPROVED PHYSICAL STRENGTH

[75] Inventors: Roger J. Walton; Kenneth R. Mills, both of Bartlesville, Okla.

[73] Assignee: Phillips Petroleum Company, Bartlesville, Okla.

[22] Filed: July 5, 1974

[21] Appl. No.: 486,174

Related U.S. Application Data

[63] Continuation-in-part of Ser. No. 246,202, April 21, 1972, abandoned.

[52] U.S. Cl. . 260/2.5 HA; 260/2.5 FP; 260/45.7 R; 260/45.75 T; 260/45.85 B; 260/78.4 R; 260/897 R; 260/DIG. 24

[51] Int. Cl.$^2$.......................... C08J 9/04; C08K 5/09

[58] Field of Search... 260/2.5 HA, 2.5 FP, 45.85 B, 260/DIG. 24

[56] References Cited

UNITED STATES PATENTS

| | | | |
|---|---|---|---|
| 3,256,238 | 6/1966 | Anagnostopoulos et al.. | 260/2.5 HA |
| 3,432,461 | 3/1969 | Hill et al. | 260/45.75 K |
| 3,502,613 | 3/1970 | Berger | 260/45.85 B |
| 3,639,304 | 1/1972 | Raley | 260/2.5 FP |

*Primary Examiner*—Wilbert J. Briggs, Sr.

[57] ABSTRACT

Foamed flame retardant polyolefin compositions having improved physical strength are obtained by the addition of a phenylbenzoate stabilizer to said compositions.

21 Claims, No Drawings

FOAMED FLAME RETARDANT POLYOLEFIN COMPOSITIONS OF IMPROVED PHYSICAL STRENGTH

This application is a continuation-in-part of copending application Ser. No. 246,202, filed Apr. 21, 1972, now abandoned.

This invention relates to foamed flame retardant polyolefin compositions and to methods for the preparation of same.

Foamed flame retardant polyolefin compositions are desirable articles of manufacture in the form of plastic pipe, rods, sheets, films and the like in many commercial applications. Frequently, however, the low physical strength characteristics generally associated with said compositions restrict or eliminate their use in many commercial applications. Accordingly, in order to provide foamed flame retardant polyolefin compositions having improved physical strength properties, research efforts designed to characterize and identify foamed flame retardant polyolefin compositions having improved physical strength characteristics continue.

It is an object of this invention to provide foamed flame retardant polyolefin film compositions of improved physical strength. Other objects of this invention will be apparent from the written description and the appended claims.

According to this invention, foamed flame retardant polyolefin compositions are stabilized against physical strength degradation by the addition of a phenylbenzoate to said compositions.

The polyolefins that can be employed in the practice of this invention are homopolymers derived from the polymerization of 1-monoolefins having from 3 to 8 carbon atoms and copolymers derived from the polymerization of 1-monoolefins having from 3 to 8 carbon atoms with a minor amount of at least one other monomer copolymerizable therewith. The presently preferred copolymers are derived from the polymerization of 1-monoolefins having from 3 to 8 carbon atoms with 1-monoolefins having from 2 to 8 carbon atoms. In most instances, the preferred polyolefins are homopolymers of propylene, or copolymers of propylene with minor amounts of other monomers copolymerizable therewith such as ethylene, butene-1, hexene-1, octene-1, and the like. Even more preferred are polyolefins wherein at least 90 mol percent of the polyolefin is derived from the polymerization of propylene monomeric units. Still even more preferred, because of their commercial importance are propylene polymers wherein at least 90 mol percent of the polyolefin is derived from the polymerization of propylene and from about 0.5 to 10 mol percent of the polyolefin is derived from the polymerization of a comonomer selected from ethylene or butene-1.

The flame retardant additives that can be employed in the practice of this invention are any halogenated organic compound, preferably halogenated cycloalkanes and halogenated bis-cycloalkanes. Presently preferred halogenated organic compounds are those which have a halogen content of at least about 30 weight percent, more preferably a halogen content of from about 30 to about 90 weight percent, based on the total weight of the halogenated organic compound. Illustrative of specific halogenated organic compounds that are included within the term flame retardant additives are the following:

bromocyclohexane
1,2-dibromocyclononane
1,4-dichlorocyclohexane
1,2,3,4-tetrachlorocyclooctane
1,2,5,6,9,10-hexabromocyclododecane
bis(2,5-dibromocyclopentyl)dibromomethane
1,2-bis(3,4-dibromocyclohexyl)-1,2-dibromoethane
1,2-bis(3,4-dichlorocyclohexyl)-1,2-dichloroethane
1,2-dibromo-4-methyl-6,8,10-triisopropylcyclodecane
1-(3,5-dibromocyclohexyl)-2-(3,5-dichlorocyclohexyl)ethane and the like, and mixtures thereof.

Metal oxides can be employed in conjunction with halogenated organic compounds to improve the efficacy of the flame retardant additives; however, the use of metal oxides is optional and not mandatory in the practice of this invention. Representative metal oxides include arsenic trioxide, antimony trioxide and bismuth trioxide. Antimony oxide, preferably as the trioxide, is preferably employed when metal oxides are employed in conjunction with halogenated organic compounds.

Color inhibiting additives can be employed in the practice of this invention to limit or restrict color degradation of the halogenated organic compounds; however, the presence of a color inhibiting additive is not essential to the practice of this invention. Preferred color inhibiting additives that can be employed are organotin salts of an olefinically unsaturated diacid which can be represented by the formula:

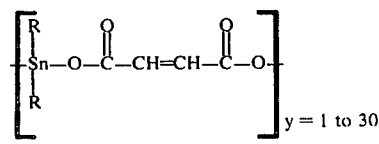

wherein independently each R is a radical, preferably hydrocarbyl, having from 1 to 12 carbon atoms including alkyl, cycloalkyl, aryl radicals or combinations thereof.

The foaming agents that can be employed in the practice of this invention are any chemical which decomposes with the liberation of a gas at a temperature range of from about 300° to about 700°F. Representative chemicals include azodicarbonamide, 4,4-oxybis(benzenesulfonyl hydrazide), dinitrosopentamethylenetetramine, diazoaminobenzene, 1,1-azobisformamide and other chemicals commonly employed as foaming agents as defined in Modern Plastics Encyclopedia 1969–70 Edition, Table IV, page 264.

The phenylbenzoate stabilizers that can be employed in the practice of this invention can be represented by the formula:

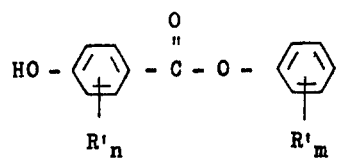

wherein each R' independently represents halogen or an aliphatic, alicyclic, aromatic hydrocarbyl or hydrocarbyloxy radical. $n$ is an integer of from 0 to 4. $m$ is an integer of from 0 to 5. Generally preferred are phenylbenzoate compounds wherein the total number of carbon atoms is within the range of from 13 to 50. Even more preferred are phenylbenzoate compounds wherein each R' is selected solely from tertiary aliphatic hydrocarbyl radicals, n is the integer 2, m is the integer 2, and the maximum number of carbon atoms in any tertiary aliphatic radical is less than 5. Illustrative of specific phenylbenzoate compounds that can be employed are the following: phenyl 4-hydroxybenzoate; 2',4'-di-t-butylphenyl 3,5-di-t-butyl-4-hydroxybenzoate; 2',4'-dicyclooctylphenyl 3,5-dicyclooctyl-4-hydroxybenzoate; 2',4'-dioctadecylphenyl 3,5-dipentadecyl-4-hydroxybenzoate; 2',4'-di(2,2'-dimethylpentyl)phenyl 3,5-di(2,2-dimethylpentyl)-4-hydroxybenzoate; 4'-octylphenyl 3,5-di-t-butyl-4-hydroxybenzoate; 3',5'-dilaurylphenyl 3,5 -di-t-octyl-4-hydroxybenzoate; 2'-t-butylphenyl 3,5-di(2,2-diethylbutyl)-4-hydroxybenzoate; p-carbethoxy 3,5-di-t-butyl-4-hydroxybenzoate; 2'-chloro-4-octylphenyl 3,5-di-t-butyl-4-hydroxybenzoate; p-bromophenyl 3,5-di-t-butyl-4-hydroxybenzoate; p-bromophenyl 3,5-di-t-butyl-4-hydroxybenzoate; o-phenylphenyl 3,5-di-t-butyl-4-hydroxybenzoate; p-phenylphenyl 3,5-di-t-butyl-4-hydroxybenzoate; p-methoxyphenyl 3,5-di-t-butyl-4-hydroxybenzoate; phenyl 3,5-di-t-butyl-4-hydroxybenzoate; 4'-phenoxyphenyl 3,5-di-t-butyl-4-hydroxybenzoate; 4'-cyclopropoxyphenyl 3,5-di-octyl-4-hydroxybenzoate; 4'-octadecylphenyl 3,5-di-t-amyl-4-hydroxybenzoate; 4'-dodecylphenyl 2-n-decyl-4-hydroxybenzoate; and mixtures thereof.

The proportions of the various ingredients employed in the preparation of the foamed flame retardant polyolefin compositions of this invention can vary widely. The total amount of all ingredients other than polyolefin can comprise as much as about 15 percent by weight of the foamed flame retardant polyolefin composition. Preferably, other than polyolefin, the total parts of all other ingredients comprise no more than 10 percent by weight of the foamed flame retardant compositions. On an individual weight basis, based on 100 parts of polyolefin, the halogenated organic compound is present in an effective amount and is generally present in an amount of from about 3 to about 10 parts, preferably in an amount of at least 3 parts, more preferably in an amount of from 3 to 6 parts; the metal oxide, if present, is present in an effective amount and is generally present in an amount of at least 0.1 part, preferably in an amount of from 0.1 to 0.5 part, more preferably in an amount of from about 0.15 to about 3 parts; the color inhibiting additive, if present is present in an effective amount and is preferably present in an amount of from 0.2 to 0.3 part; the blowing agent is present in an effective amount and is generally present in an amount of from about 0.1 to about 1 part, preferably in an amount of at least 0.25 part, more preferably in an amount of from 0.25 to 0.5 part; and the phenylbenzoate stabilizer is present in an effective amount and is generally present in an amount of from about 0.1 to about 1.5 parts, preferably in an amount of at least 0.3 part, more preferably in an amount of from 0.3 to 0.5 part. An effective amount of any of the ingredients added to the polyolefin is any amount which produces a useful effect consistent with the purpose for which the addition was made. The foamed flame retardant polyolefin compositions preferentially contain at least 90 percent polyolefin since said compositions exhibit highly desirable film strength when in ribbon or sheet form. In the preparation of the foamed flame retardant polyolefin compositions of this invention, the various ingredients of the compositions are combined by means suited to the intimate admixture of the various ingredients under conditions which do not activate the foaming agent contained within the admixture. Subsequently the intimate admixtures of foamable flame retardant polyolefin compositions are formed into foamed products under processing temperature and pressure conditions which promote or activate the decomposition of the foaming agent with concurrent liberation of gaseous material from said foaming agent.

Set out hereafter are examples which illustrate the invention. Included is an example of the best mode of practicing the invention which is not to be considered as unduly limitative thereof.

EXAMPLE I

Various polyolefin compositions, set out in Table I hereafter, were separately dry blended. Said compositions were then formed into foamed films 4 mils thick by means of a Brabender Plastograph Extruder equipped with a 1-inch wide slot die. The resulting foamed films were subsequently exposed continuously for 100 hours to the radiation from a carbon arc weatherometer, and the percent tensile strength retained following the aforesaid 100-hour exposure was determined in accordance with ASTM D-638-61. The flame retardancy characteristics of the foamed polyolefin composition were measured by exposing the foamed films to an open gas flame to determine if the compositions would burn, as well as by LOI values obtained by methods described by Jack L. Isaacs, J. Fire and Flammability I, pp. 36–47 (January 1970), using the equipment shown in FIGURE I of the Isaacs article.

TABLE I

| Chemical Ingredients | Run Number | | | |
|---|---|---|---|---|
| | 1 | 2 | 3 | 4 |
| Polyolefin[a] | 100 | 100 | 100 | 100 |
| Halogenated Organic Compound[b] | — | 4 | 4 | 4 |
| Metal Oxide[c] | — | 2 | 2 | 2 |
| Color Inhibitor[d] | — | 0.25 | 0.25 | 0.25 |
| Foaming Agent[e] | 0.25 | 0.25 | 0.25 | 0.25 |
| Stabilizer-1[f] | — | — | — | 0.08 |
| Stabilizer-2[g] | 0.04 | 0.04 | 0.04 | — |
| Stabilizer-3[h] | — | 0.40 | — | — |
| Stabilizer-4[i] | — | — | 0.40 | 0.40 |
| Test Conditions | Percent Tensile Strength Retained | | | |
| ASTM D-638-61 | 37 | 30 | 77 | 69 |
| | Flame Retardancy Test Results | | | |
| | | Non- | Non- | Non- |
| Open Gas Flame | Burns | burning | burning | burning |
| | | Not | | |

TABLE I-continued

| Chemical Ingredients | Run Number | | |
|---|---|---|---|
| L.O.I. | 18 | available | 29.4 | 29.7 |

(a)Propylene homopolymer having a nominal melt flow index of 4 (ASTM D-1238-65T, Condition L)
(b)1,2-bis(3,4-dibromocyclohexyl)-1,2-dibromoethane
(c)Antimony trioxide
(d)An organotin compound of the formula set out hereinbefore, wherein each R radical is a tertiary butyl radical, and y equals about 2.
(e)1,1-Azobisformamide
(f)Octadecyl-3-(3',5'-di-tertiary butyl-4'-hydroxyphenyl)propionate
(g)2,6-di-tertiary butyl-4-methylphenol
(h)2-hydroxy-4-n-octoxybenzophenone
(i)2,4-di-tertiary-butylphenyl 3,5-ditertiary butyl-4-hydroxybenzoate.

The above data show that foamed flame retardant polyolefin compositions of improved physical strength are obtained wherein phenylbenzoate stabilizers are employed in said compositions.

Further modifications of the teachings of this invention in the use of phenylbenzoate stabilizers to improve the physical strength of foamed flame retardant polyolefin compositions will be apparent to those skilled in the art.

We claim:

1. A foamed flame retardant polyolefin composition comprising a polyolefin selected from homopolymers derived from the polymerization of 1-monoolefins having from 3 to 8 carbon atoms, and copolymers derived from the polymerization of 1-monoolefins having from 3 to 8 carbon atoms with a minor amount of at least one 1-monoolefin having from 2 to 8 carbon atoms; an effective flame retardant amount of a halogenated organic compound; and an effective stabilizing amount of a phenylbenzoate stabilizer having the formula:

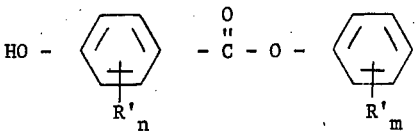

wherein each R' is the same or different and independently represents halogen or an aliphatic, alicyclic, aromatic hydrocarbyl or hydrocarbyloxy radical, n is an integer of from 0 to 4, and m is an integer of from 0 to 5.

2. A composition in accordance with claim 1 wherein from about 3 to about 10 parts by weight of said halogenated organic compound and from about 0.1 to about 1.5 parts by weight of said phenylbenzoate stabilizer are present for each 100 parts by weight of said polyolefin.

3. A composition in accordance with claim 2 wherein from 3 to 6 parts by weight of said halogenated organic compound, from 0.25 to 0.5 part by weight of said foaming agent, and from 0.3 to 0.5 part by weight of said phenylbenzoate stabilizer are present for each 100 parts by weight of said polyolefin.

4. A composition in accordance with claim 1 wherein said polyolefin is polypropylene.

5. A composition in accordance with claim 4, wherein said polypropylene is a homopolymer of propylene and said halogenated organic compound is selected from halogenated cycloalkanes and halogenated biscycloalkanes.

6. A composition in accordance with claim 5 wherein said phenylbenzoate stabilizer is 2,4-di-tertiary-butylphenyl 3,5-di-tertiarybutyl-4-hydroxybenzoate.

7. A composition in accordance with claim 1 wherein said halogenated organic compound has a halogen content of at least about 30 weight percent based on the total weight of the halogenated organic compound; and wherein said composition further comprises a metal oxide selected from oxides of arsenic, antimony, and bismuth; and a color inhibitor having the formula:

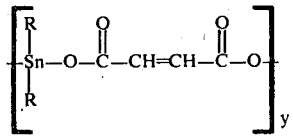

wherein each R is the same or different and is independently selected from alkyl, cycloalkyl, aryl radicals and combinations thereof, and y is an integer of from 1 to 30.

8. A composition in accordance with claim 7 wherein said polyolefin is polypropylene.

9. A composition in accordance with claim 8 wherein at least 3 parts by weight of said halogenated organic compound, at least 0.1 part by weight of said metal oxide, at least 0.2 part by weight of said color inhibitor, at least 0.25 part by weight of said foaming agent, and at least 0.3 part by weight of said phenylbenzoate stabilizer are present for each 100 parts by weight of polypropylene.

10. A composition in accordance with claim 9, wherein said polypropylene is a homopolymer of propylene and said halogenated organic compound is selected from halogenated cycloalkanes and halogenated biscycloalkanes.

11. A composition in accordance with claim 10 wherein said phenylbenzoate stabilizer is 2,4-di-tertiary-butylphenyl 3,5-di-tertiarybutyl-4-hydroxybenzoate, wherein said halogenated organic compound is 1,2-bis(3,4-dibromocyclohexyl)-1,2-dibromomethane, wherein said foaming agent is 1,1-azobisformamide, wherein said metal oxide is antimony trioxide, and wherein each R of said color inhibitor formula is a tertiary butyl radical and y is equal to about 2.

12. A method of preparing foamed flame retardant polyolefin compositions having improved physical strength, said method comprising:

admixing a polyolefin selected from homopolymers derived from the polymerization of 1-monoolefins having from 3 to 8 carbon atoms and copolymers derived from the polymerization of 1-monoolefins having from 3 to 8 carbon atoms with a minor amount of at least one 1-monoolefin having from 2 to 8 carbon atoms, an effective flame retardant amount of a halogenated organic compound, an effective amount of a foaming agent, and an effective stabilizing amount of a phenylbenzoate stabilizer having the formula:

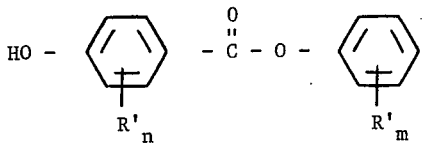

wherein each R' is the same or different and independently represents halogen or an aliphatic, alicyclic, aromatic hydrocarbyl or hydrocarbyloxy radical, n is an integer of from 0 to 4, and m is an integer of from 0 to 5; and subsequently forming foamed compositions at temperatures and pressures suited to the decomposition of the foaming agent and the formation of a homogeneous foamed flame retardant polyolefin composite.

13. A method in accordance with claim 12 wherein from about 3 to about 10 parts by weight of said halogenated organic compound, from about 0.1 to about 1 part by weight of said foaming agent and from about 0.1 to about 1.5 parts by weight of said phenylbenzoate stabilizer are present for each 100 parts by weight of said polyolefin.

14. A method in accordance with claim 13 wherein from 3 to 6 parts by weight of said halogenated organic compound, from 0.25 to 0.5 part by weight of said foaming agent, and from 0.3 to 0.5 part by weight of said phenylbenzoate stabilizer are present for each 100 parts by weight of said polyolefin.

15. A method in accordance with claim 12 wherein said halogenated organic compound has a halogen content of at least about 30 weight percent based on the total weight of the halogenated organic compound; and wherein said composition further comprises a metal oxide selected from oxides of arsenic, antimony, and bismuth; and a color inhibitor having the formula:

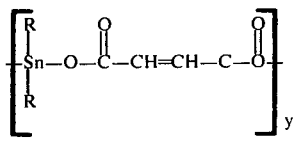

wherein each R is the same or different and is independently selected from alkyl, cycloalkyl, aryl radicals and combinations thereof, and $y$ is an integer of from 1 to 30.

16. A method in accordance with claim 15 wherein said polyolefin is polypropylene and wherein at least 3 parts by weight of said halogenated organic compound, at least 0.1 part by weight of said metal oxide, at least 0.2 part by weight of said color inhibitor, at least 0.25 part by weight of said foaming agent, and at least 0.3 part by weight of said phenylbenzoate stabilizer are present for each 100 parts by weight of polypropylene.

17. A method in accordance with claim 16 wherein said polyolefin is a homopolymer of propylene, said halogenated organic compound is 1,2-bis(3,4-dibromocyclohexyl-1,2-dibromoethane, said phenylbenzoate is 2,4-di-tertiary-butylphenyl 3,5-di-tertiary-butyl-4-hydroxybenzoate, said foaming agent is 1,1-azobisformamide, said metal oxide is antimony trioxide, each R of said color inhibitor formula is a tertiary butyl radical and $y$ is equal to about 2.

18. A foamable flame retardant polyolefin composition comprising a polyolefin selected from homopolymers derived from the polymerization of 1-monoolefins having from 3 to 8 carbon atoms, and copolymers derived from the polymerization of 1-monoolefins having from 3 to 8 carbon atoms with a minor amount of at least one 1-monoolefin having from 2 to 8 carbon atoms; an effective flame retardant amount of a halogenated organic compound; an effective foamable amount of a foaming agent; and an effective stabilizing amount of a phenylbenzoate stabilizer having the formula:

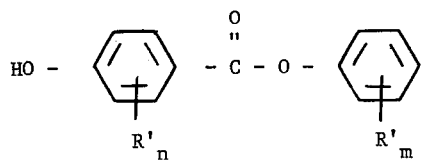

wherein each R' is the same or different and independently represents halogen or an aliphatic, alicyclic, aromatic hydrocarbyl or hydrocarbyloxy radical, n is an integer of from 0 to 4, and m is an integer of from 0 to 5.

19. A composition in accordance with claim 18 wherein from about 3 to about 10 parts by weight of said halogenated organic compound, from about 0.1 to about 1 part by weight of said foaming agent, and from about 0.1 to about 1.5 parts by weight of said phenylbenzoate stabilizer are present for each 100 parts by weight of said polyolefin.

20. A composition in accordance with claim 2 wherein from 3 to 6 parts by weight of said halogenated organic compound, and from 0.3 to 0.5 part by weight of said phenylbenzoate stabilizer are present for each 100 parts by weight of said polyolefin.

21. A composition in accordance with claim 3 wherein said polyolefin is polypropylene.

* * * * *